No. 886,493. PATENTED MAY 5, 1908.
J. W. GERMANY.
LOG TRUCK.
APPLICATION FILED AUG. 26, 1907.
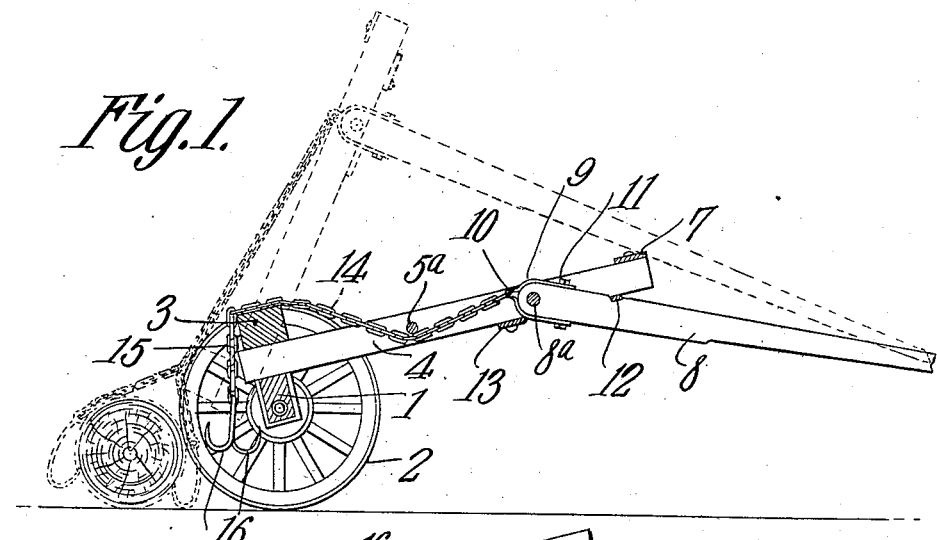
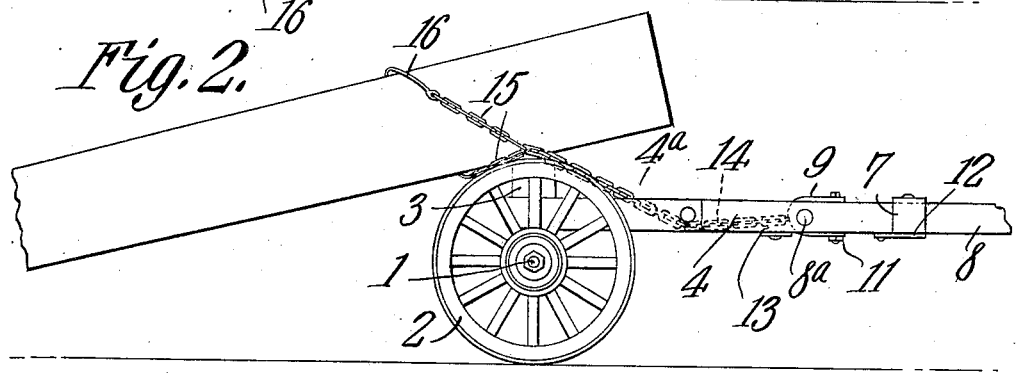
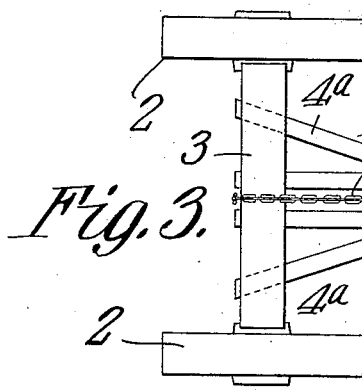
James W. Germany, Inventor,
Witnesses
By C. A. Snow & Co.
Attorneys

UNITED STATES PATENT OFFICE.

JAMES W. GERMANY, OF COOPERVILLE, MISSISSIPPI.

LOG-TRUCK.

No. 886,493.  Specification of Letters Patent.  Patented May 5, 1908.

Application filed August 26, 1907. Serial No. 390,218.

*To all whom it may concern:*

Be it known that I, JAMES W. GERMANY, a citizen of the United States, residing at Cooperville, in the county of Scott and State of Mississippi, have invented a new and useful Log-Truck, of which the following is a specification.

This invention relates to a truck or cart for transporting logs from one place to another; and having for its object, means for quickly placing the truck in position at one end of the log and then, by means of grab chains and hooks, engage the log which, as the truck is drawn forward, raises the engaged end of the log by means of the grab chains onto the truck and holds it there while the log is drawn away with one end resting on the ground.

In the accompanying drawing:—Figure 1 is a longitudinal sectional view of the truck in the act of lifting a log. Fig. 2 is a side view of the truck with a log in position thereon. Fig. 3 is a plan view of the truck.

Similar reference numerals are used on all the figures to designate the same parts.

The numeral 1 indicates a heavy axle on which are mounted at the ends, broad low wheels 2 for carrying the truck. Bolted between the axle 2 and a strong timber 3 above them, are two parallel, forwardly extending beams or hounds 4 and 5 separated from each other by a space 6 about equal in width to the thickness of one of the hounds. The forward end of the hounds are rigidly joined together by a band of iron or steel 7, extending up the outer sides of the hounds and across their top edges from one side to the other and firmly bolted to them.

Pivoted in the space 6 between the hounds 4 and 5 and some distance back from their front ends is a pole or tongue 8, the rear end of which is preferably concentric with the axis of the pivot bolt 8$^a$. A strap 9 surrounds the rear end of the pole 8 with an eye 10 extending rearwardly therefrom and is fastened securely by means of a bolt 11 passing vertically through the ends of said strap and the pole.

To strengthen the hounds 4 and 5, a side or brace hound 4$^a$ is fastened between the axle 1 and the timber 3 near each wheel and extends inwardly toward the main hounds and are fastened thereto by a through bolt 5$^a$. The timber 3 extends across the truck from wheel to wheel and is firmly fastened to the axle to prevent it loosening.

Pivoted to one of the hounds on its under side and near its forward end is a finger 12 which is long enough to extend across the space 6 and the other hound. Just back of the rear end of the tongue 8 is a heavy metal plate 13 bolted to the under edges of the hounds to limit the downward movement of the tongue, the upward movement of the tongue is limited by the band 7 which holds said tongue parallel to the hounds as in Fig. 2. When the hounds are tilted upward, see Fig. 1, until the tongue is below the finger 12, the latter may then be turned across the tongue thus forming a rest for the hounds if it is desired to hold them in a slightly elevated position.

Fastened securely to the eye 10 on the strap 9 is a rearwardly extending chain 14 which after passing under the bolt 5$^a$ is divided at a suitable place into two chains 15, each of said latter chains carrying a grab hook 16 on its end. With these hooks the end of a log is seized and drawn upon the truck.

In operation, a truck is drawn by a team towards the end of a log. The truck is at first in the position indicated in Fig. 2. As it approaches the log the front ends of the hounds are slightly elevated so that the finger 12 may be swung between the pole and the hounds, fitting in a notch made in the pole. The truck is now backed against the side of the log near one end until the wheels 2 strike it, as shown in Fig. 1. The team is now backed and as the hounds and pole are at an angle to each other, the former will swing on the axle as a center in an upward direction, (see dotted lines in Fig. 1) carrying the pivoted end of the pole with it and causing the finger 12 to drop in line with the hound. The grab chains are now placed around the log and the hooks driven into it. All being ready, the team is started ahead, drawing down the hounds and raising the end of the log which is brought to rest on the timber 3. The hounds and the pole are now in line and the finger 12 is then turned under the pole so that the hounds cannot rise during any future operation. Having placed the log on the truck the latter is turned until the axle is at a right angle to the log, which may now be carried off.

When the truck has reached the place for unloading the log it is driven into position, the truck turned with its axle parallel with the log, and after unfastening the key, the log will fall by its own weight. Now by disengaging the grab hooks the truck is ready to get another log.

Having described the invention what is claimed is:

1. A log truck comprising an axle and carrying wheels, forwardly extending parallel hounds, a pole pivoted between said hounds near their forward ends, a grab chain and hooks attached to the rear of said pole, and a finger for holding said hounds and pole at an angle to each other.

2. A log truck comprising an axle and supporting wheels, forwardly extending parallel hounds, a supporting timber above said hounds and parallel to said axle, the whole being securely connected together, a pole pivoted near the forward ends of said hounds and between them, a grab chain and hooks extending rearwardly from said pole, and means for holding said pole in line with, or at an angle to, the hounds.

3. A log truck provided with parallel forwardly extending hounds, a pole or tongue pivoted between said hounds, a plate bolted to the under edges thereof, and a band extending over the front ends of said hounds, both plate and band serving as stops to limit the movement of the pole, and a grab chain and hooks attached to the rear end of the pole.

4. A log truck provided with parallel forwardly extending hounds, a pole or tongue pivoted between the hounds near their front ends and means adapted to be placed between said tongue and hounds to hold them at an angle to each other.

In testimony that I claim the foregoing as my own, I have hereto affixed my signature in the presence of two witnesses.

JAMES W. GERMANY.

Witnesses:
J. W. HUGHES,
T. J. EASTERLING.